Feb. 2, 1954   F. M. HILL ET AL   2,667,922
MACHINE FOR CUTTING SHEET MATERIAL
Filed Dec. 20, 1947   13 Sheets-Sheet 1
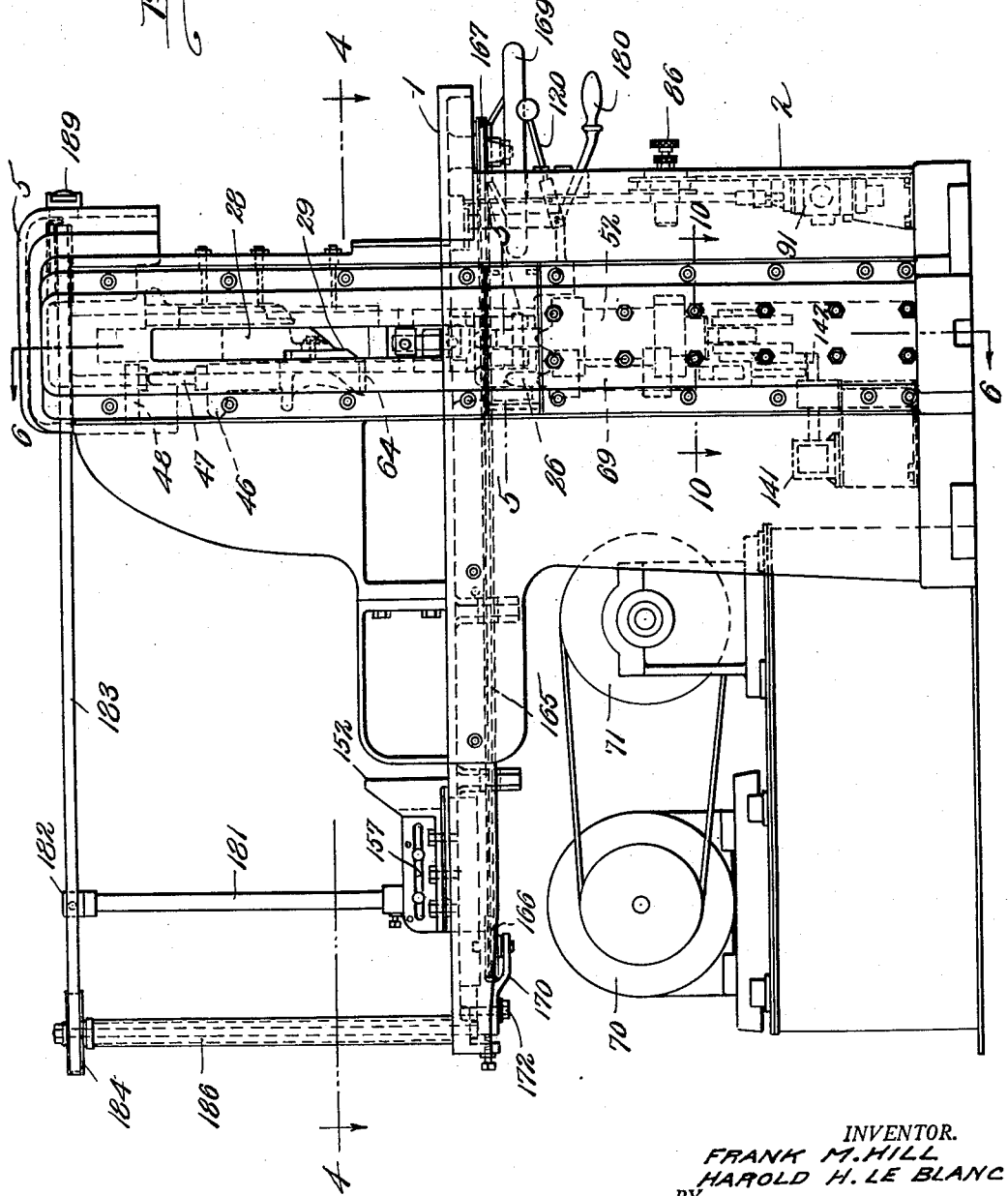
INVENTOR.
FRANK M. HILL
HAROLD H. LE BLANC
BY Dike, Calver & Porter
ATTORNEYS.

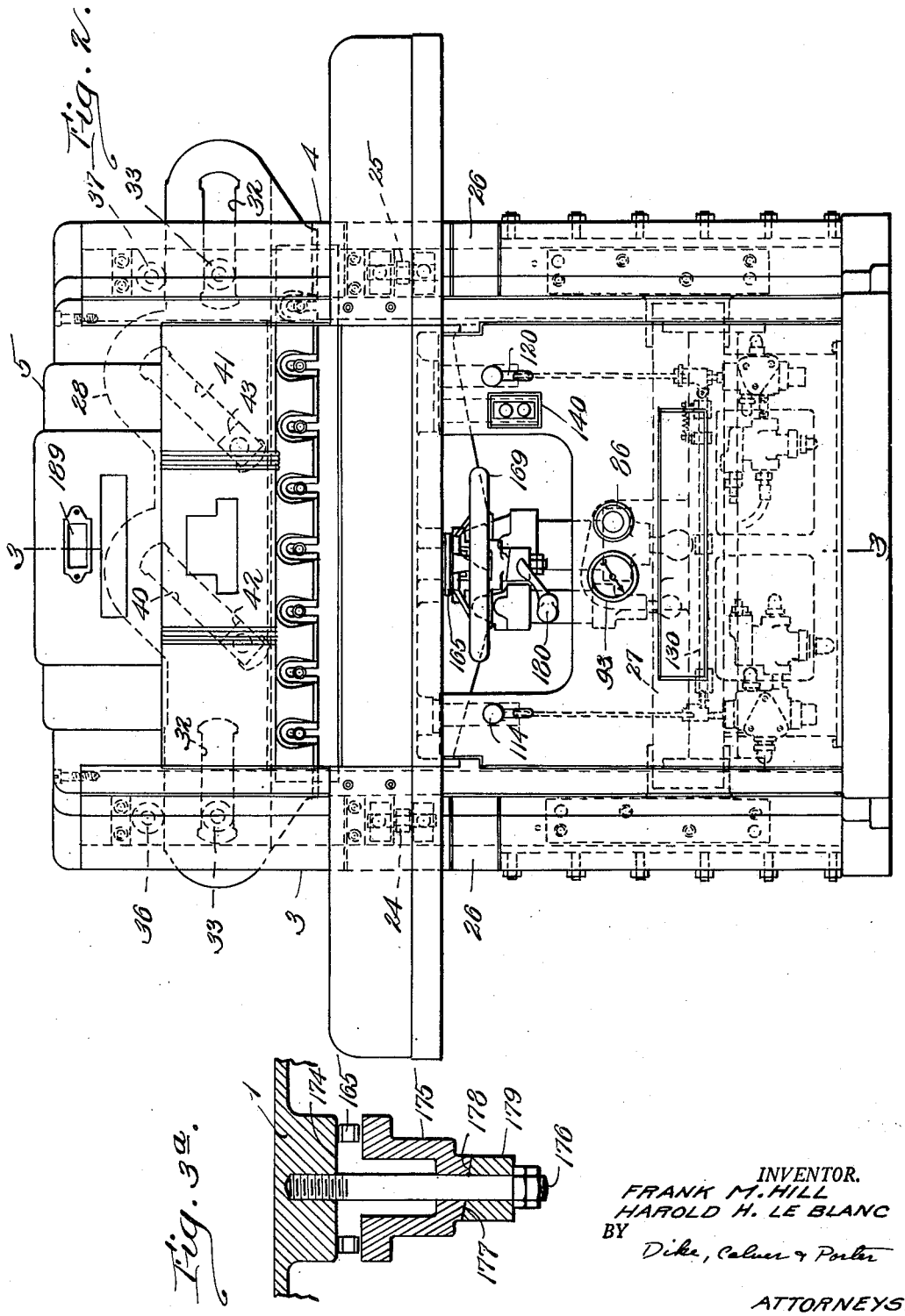

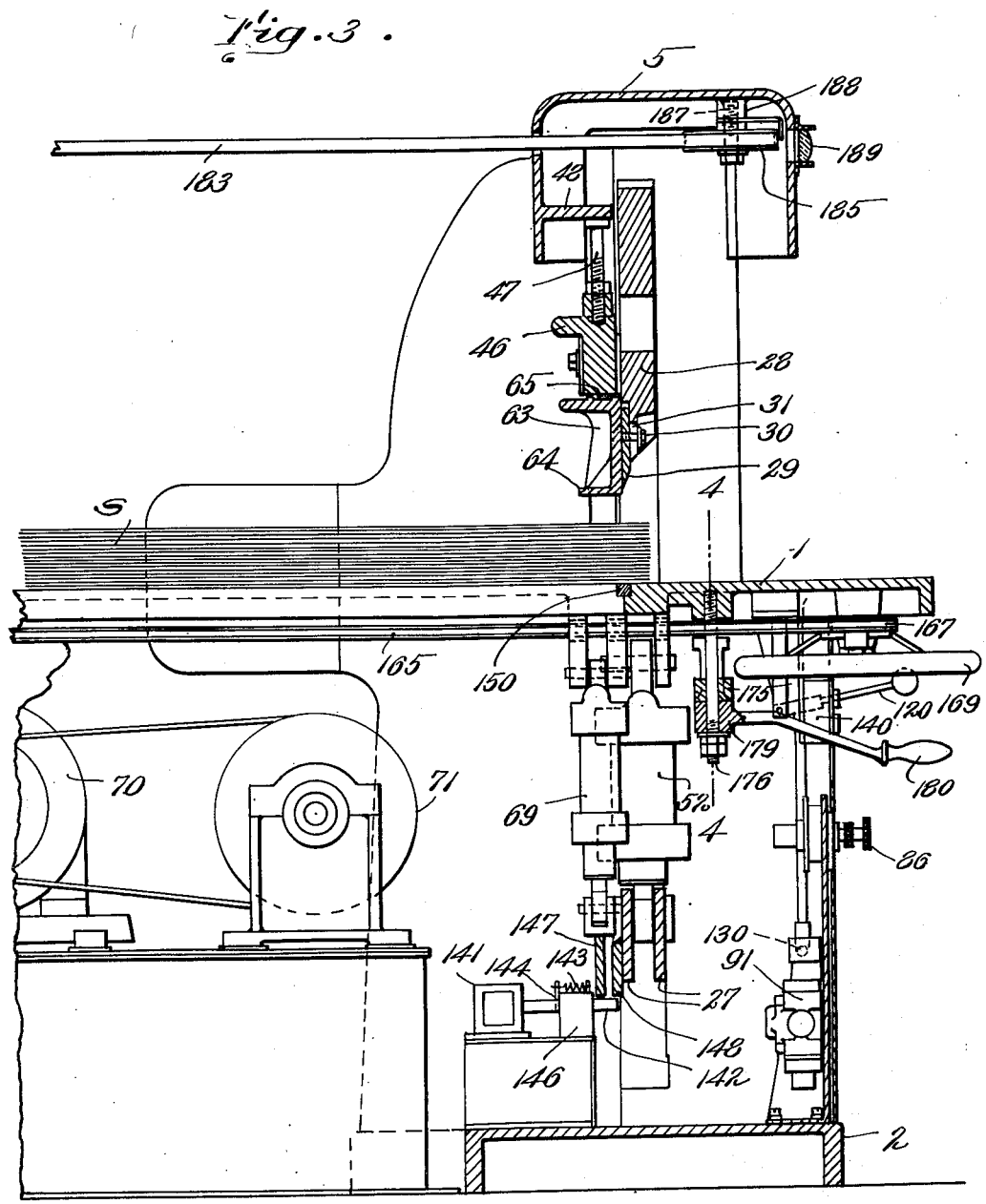

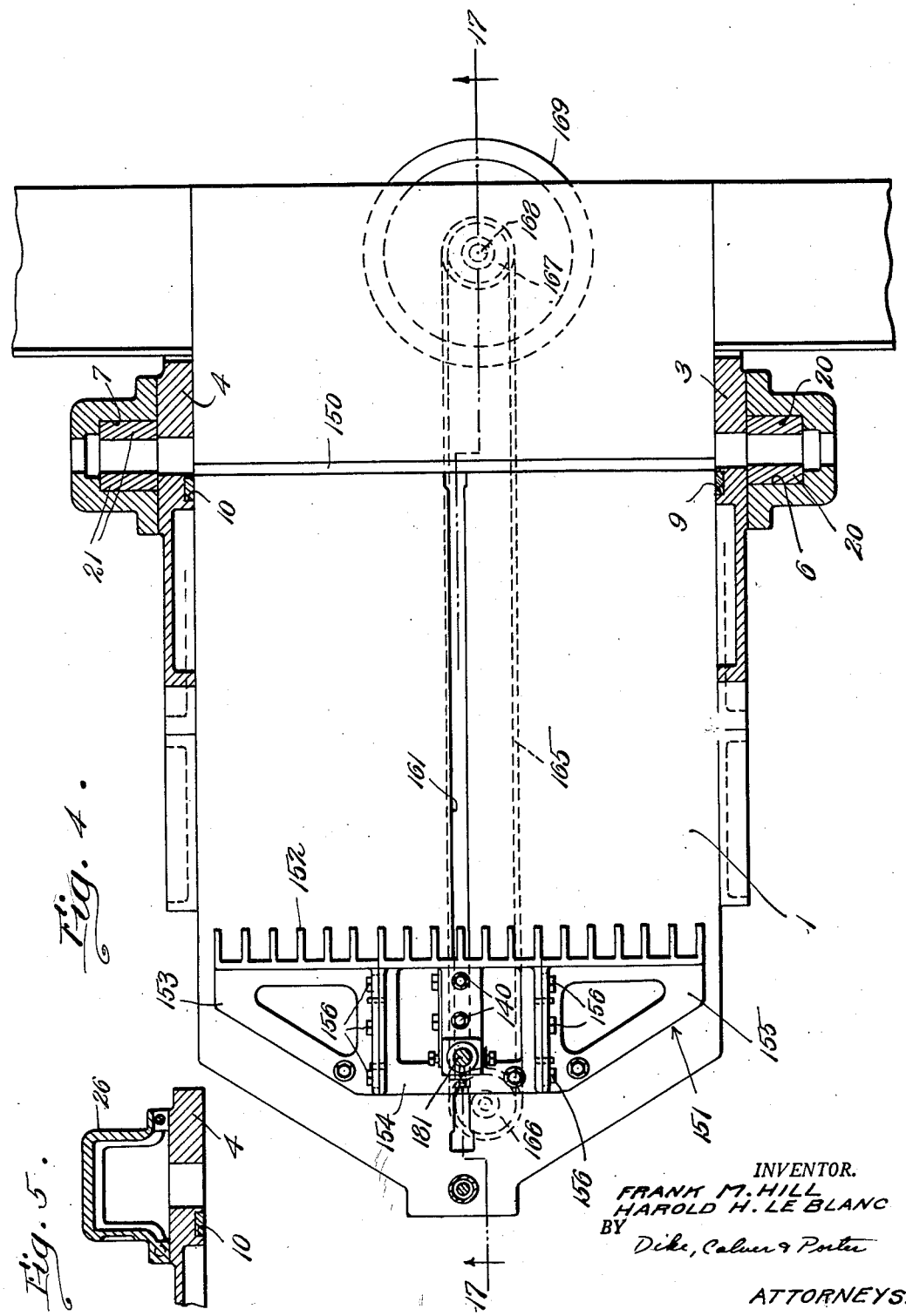

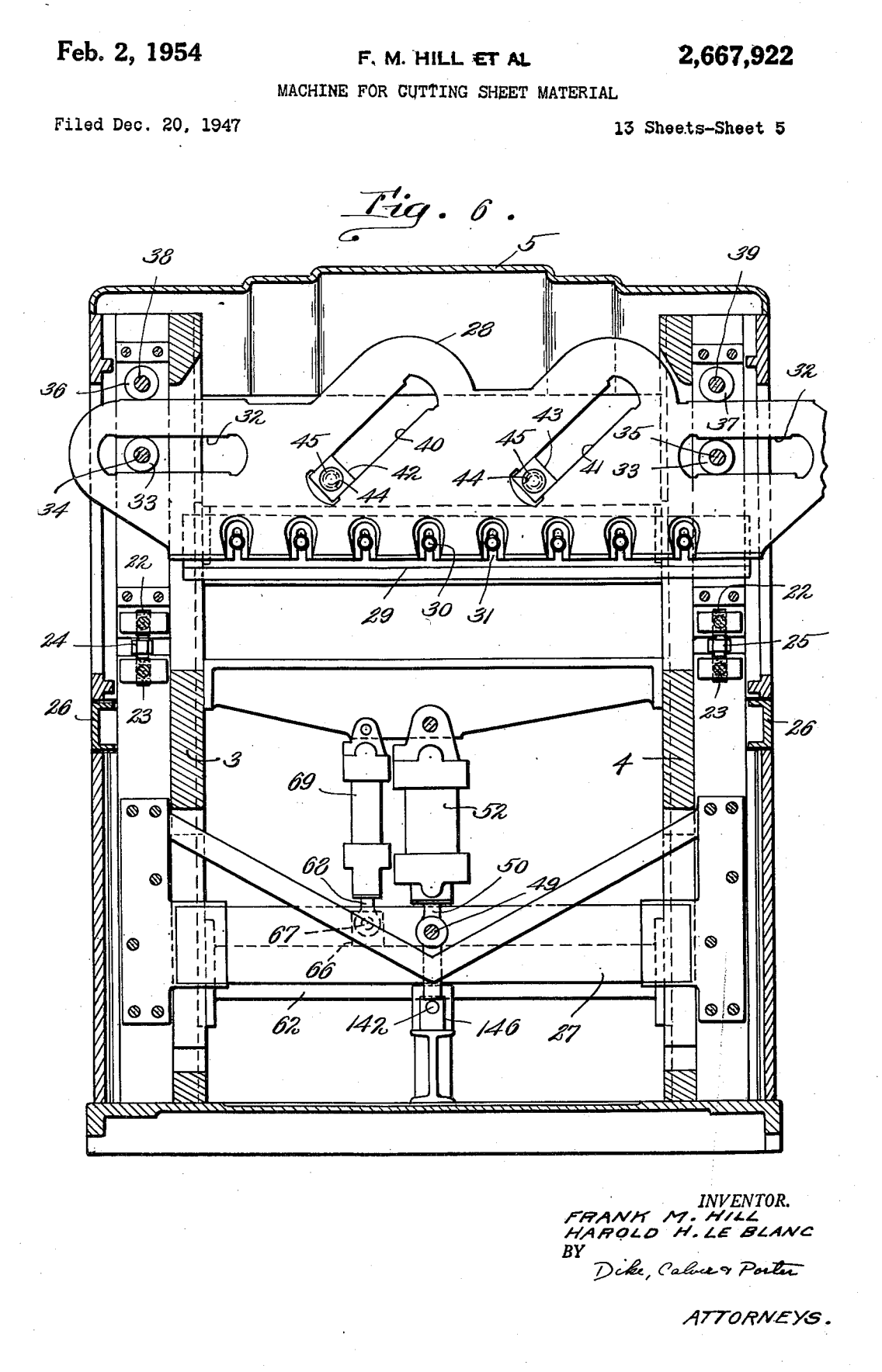

Feb. 2, 1954 F. M. HILL ET AL 2,667,922
MACHINE FOR CUTTING SHEET MATERIAL
Filed Dec. 20, 1947 13 Sheets-Sheet 5

Fig. 6.

INVENTOR.
FRANK M. HILL
HAROLD H. LE BLANC
BY
Dike, Calver & Porter

ATTORNEYS.

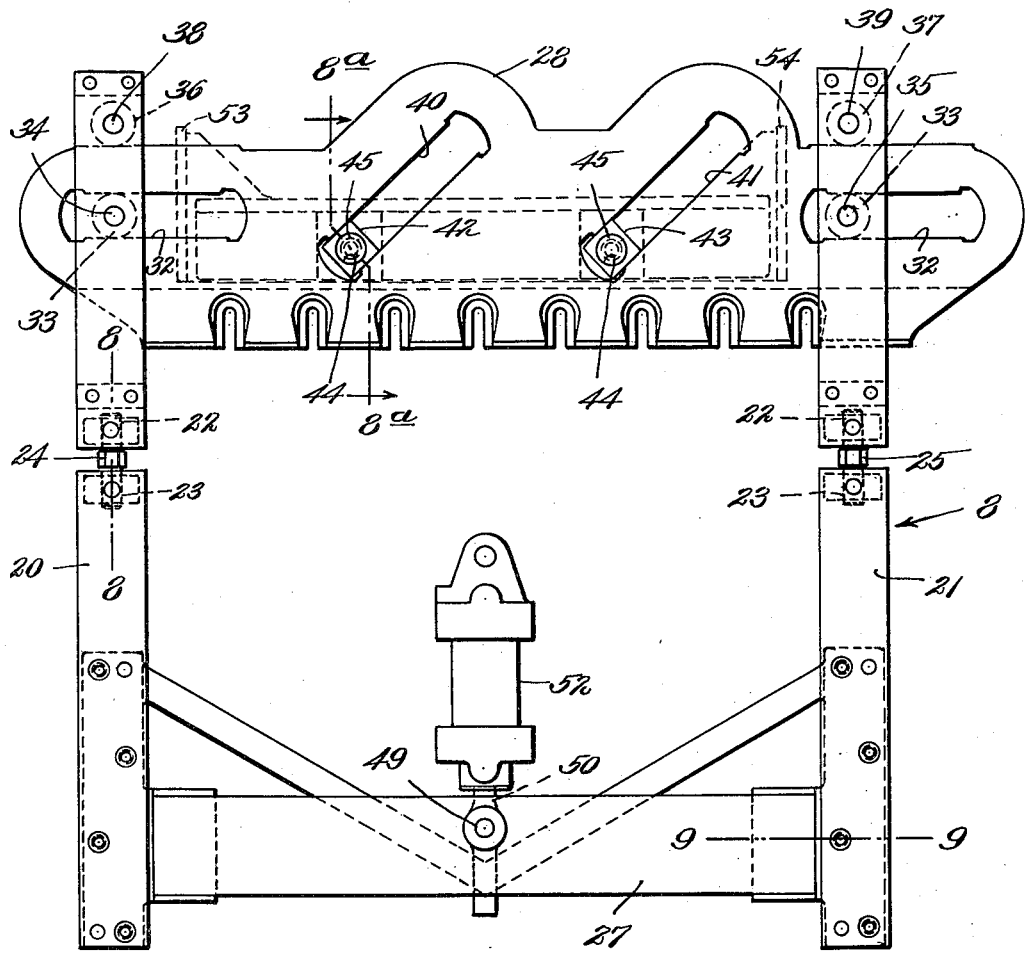
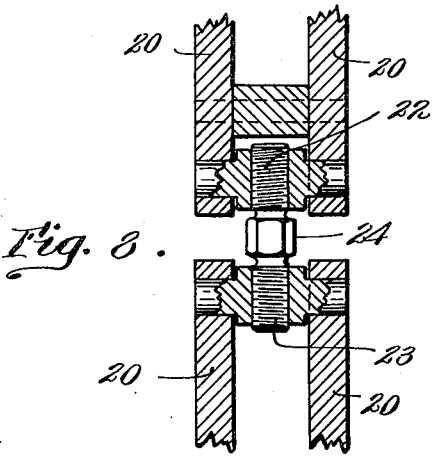

Feb. 2, 1954 F. M. HILL ET AL 2,667,922
MACHINE FOR CUTTING SHEET MATERIAL
Filed Dec. 20, 1947 13 Sheets-Sheet 7

INVENTOR.
FRANK M. HILL
HAROLD H. LE BLANC
BY Dike, Calver + Porter

ATTORNEYS.

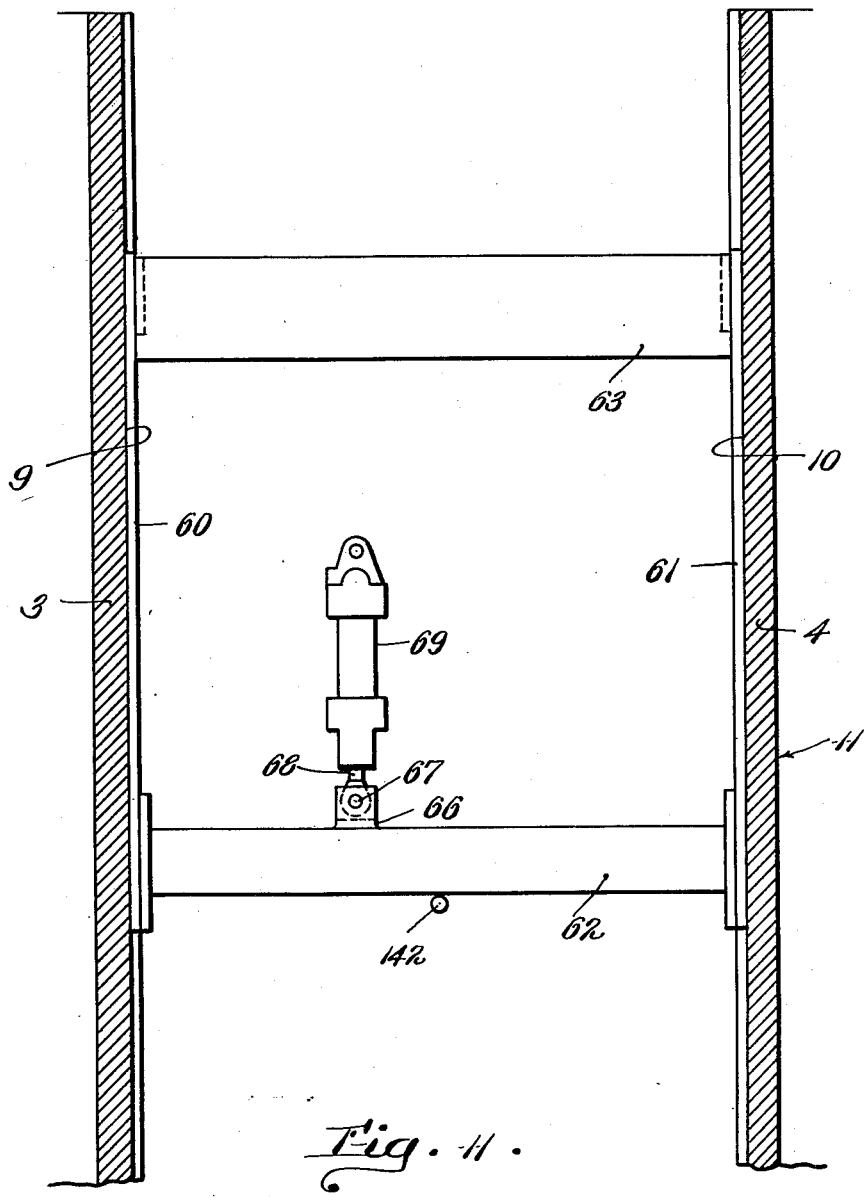

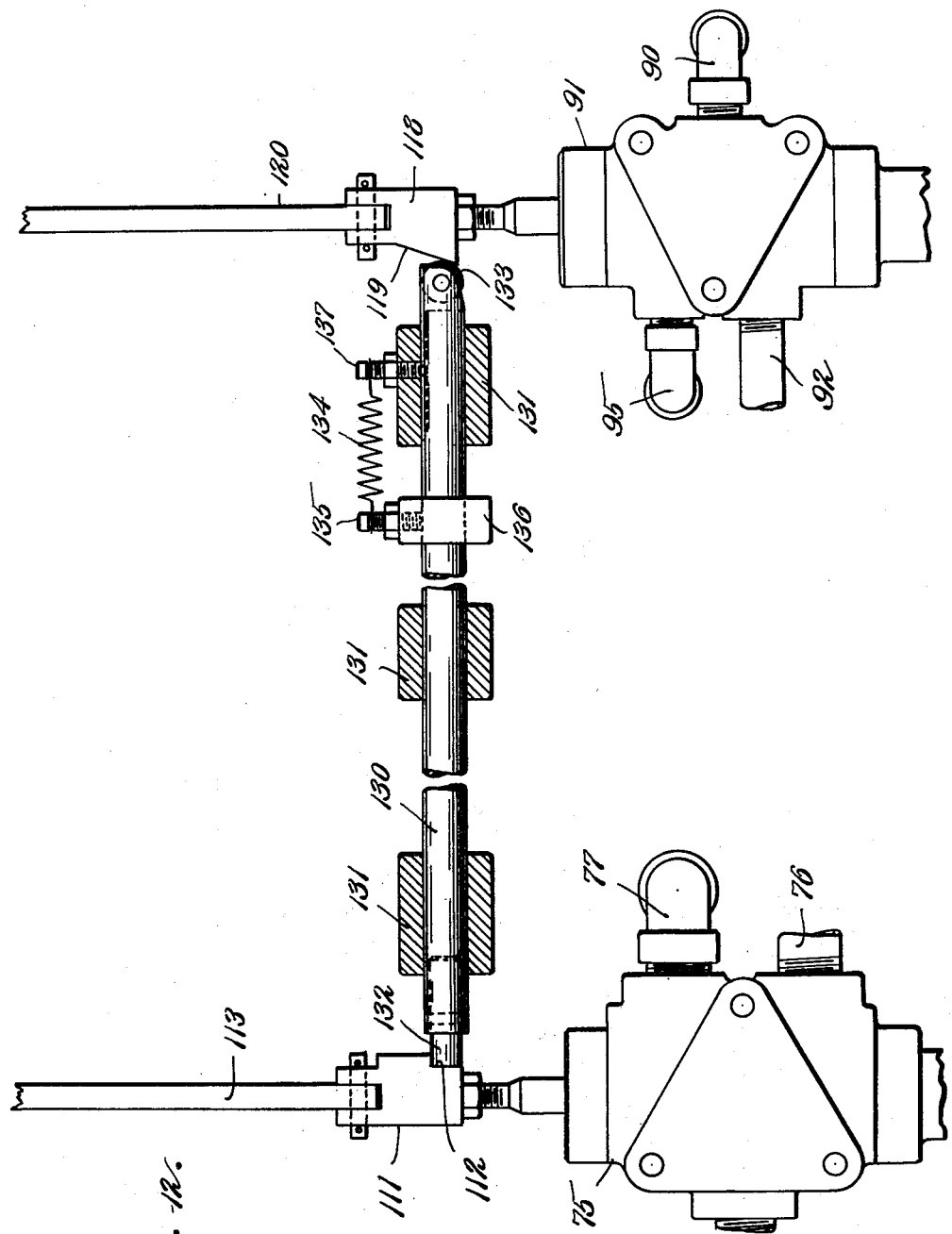

Feb. 2, 1954  F. M. HILL ET AL  2,667,922
MACHINE FOR CUTTING SHEET MATERIAL
Filed Dec. 20, 1947  13 Sheets-Sheet 10

INVENTOR.
FRANK M. HILL
HAROLD H. LE BLANC
BY
Dike, Calver & Porter
ATTORNEYS.

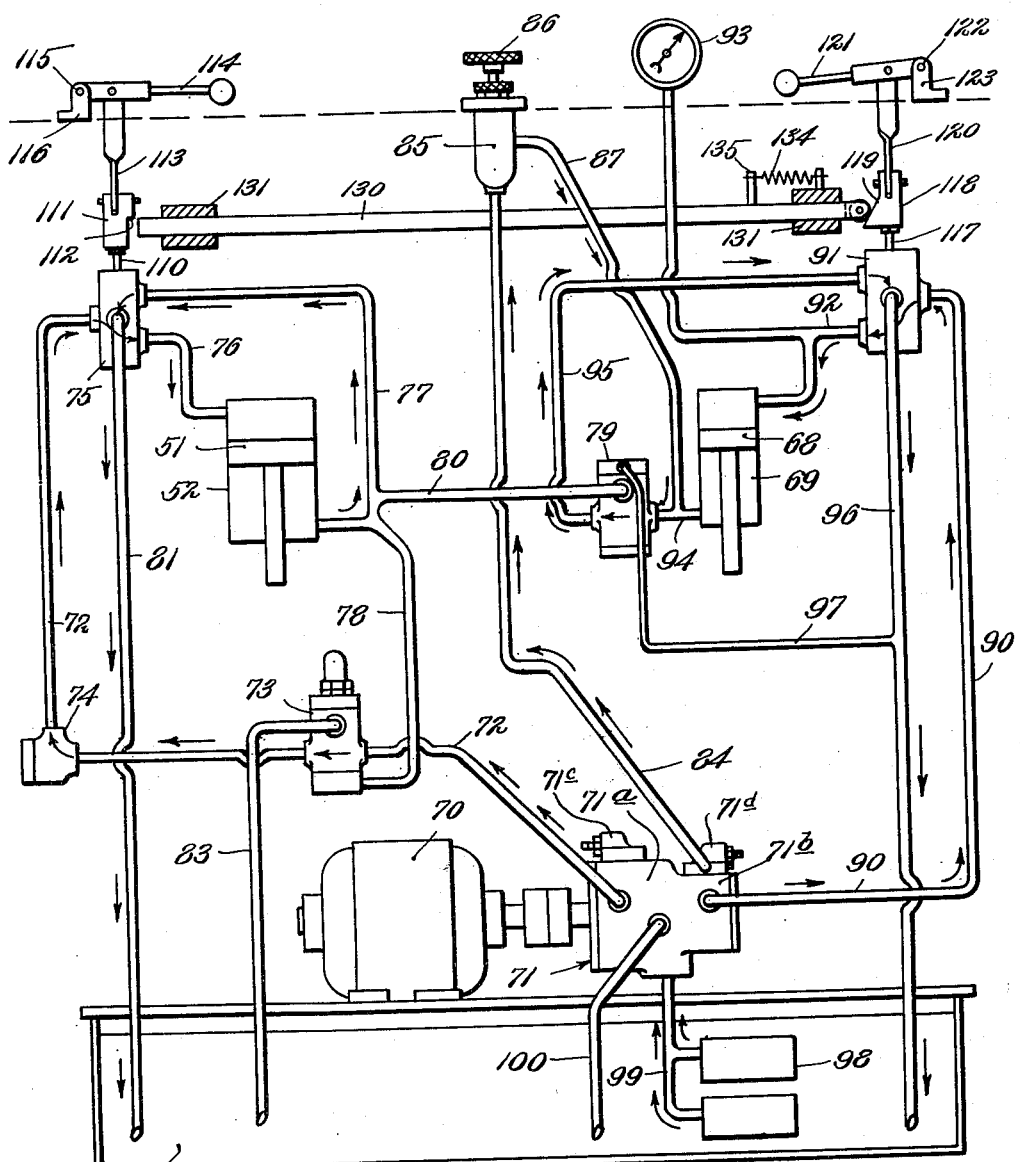

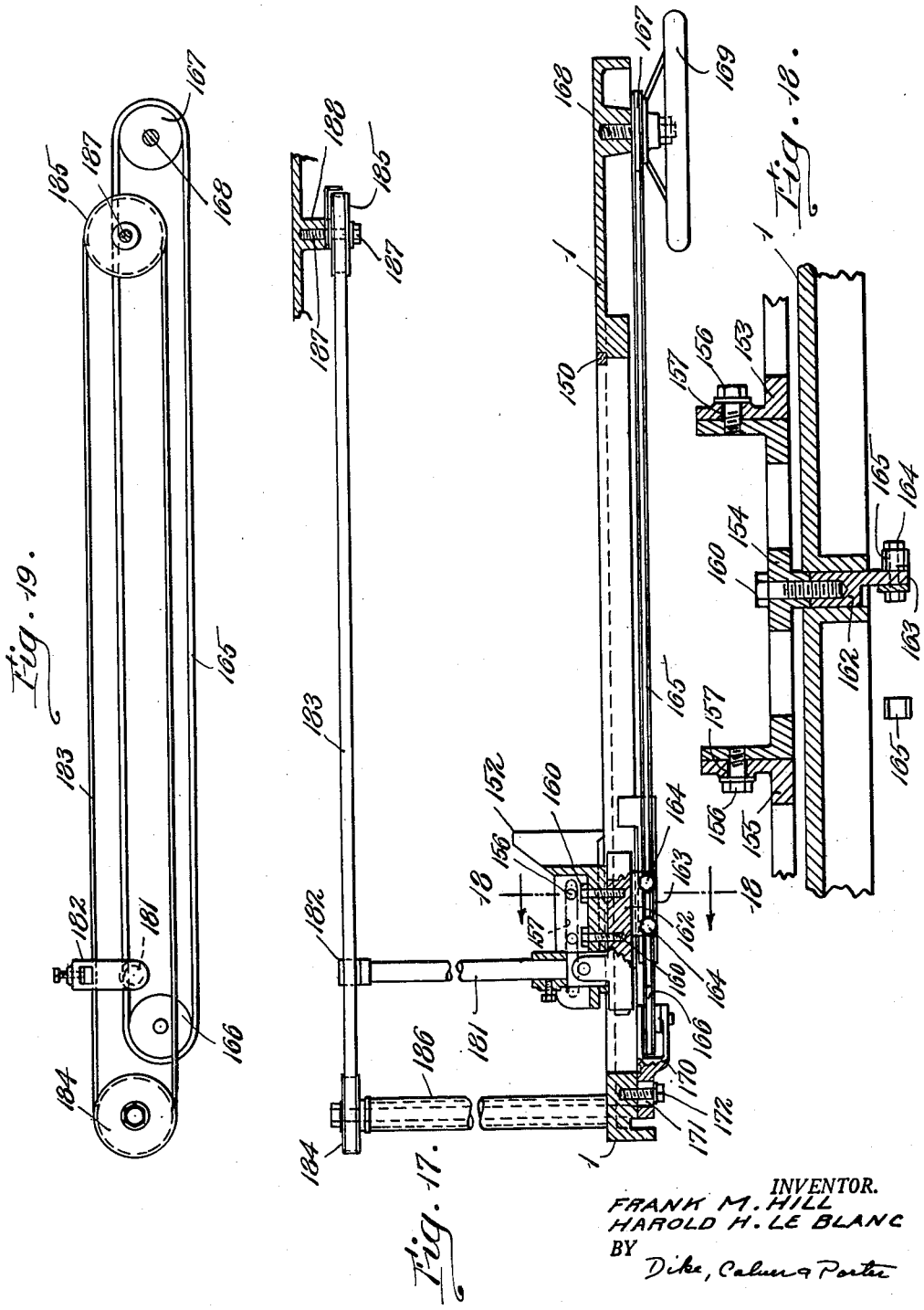

Feb. 2, 1954     F. M. HILL ET AL     2,667,922
MACHINE FOR CUTTING SHEET MATERIAL
Filed Dec. 20, 1947     13 Sheets-Sheet 13
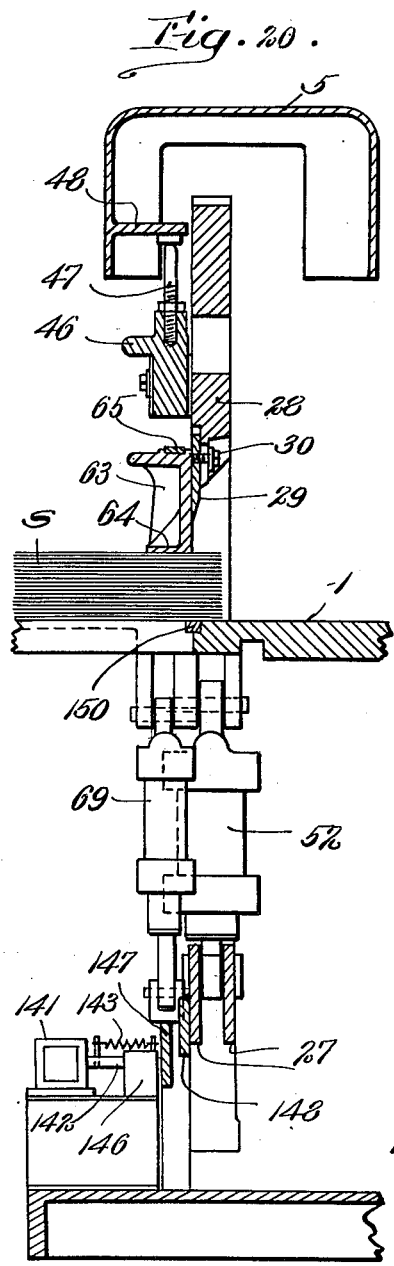
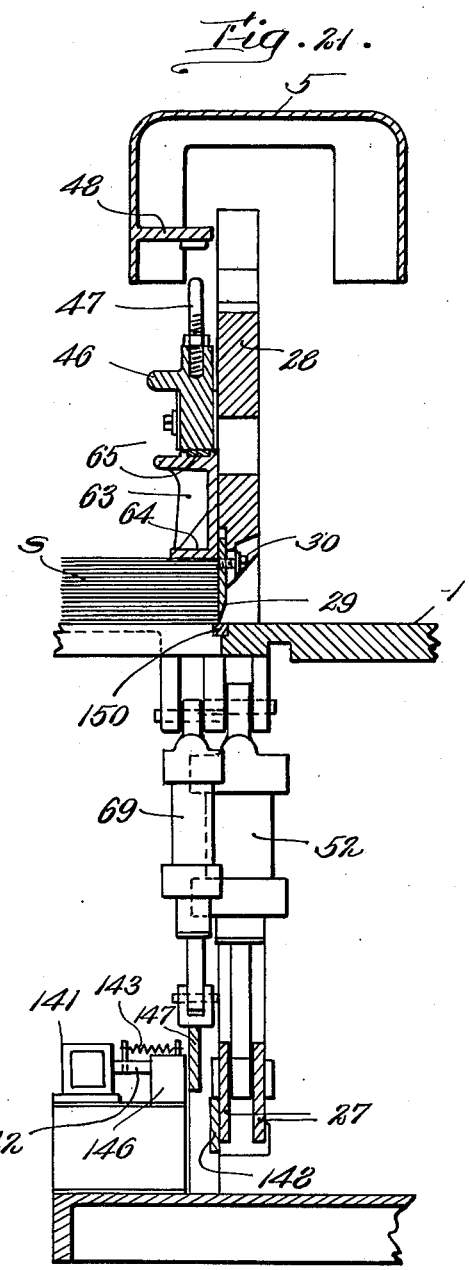
INVENTOR.
FRANK M. HILL
HAROLD H. LE BLANC
BY Dike, Calver & Porter
ATTORNEYS.

Patented Feb. 2, 1954

2,667,922

UNITED STATES PATENT OFFICE 2,667,922

MACHINE FOR CUTTING SHEET MATERIAL

Frank M. Hill, Walpole, and Harold H. Le Blanc, Norwood, Mass., assignors, by mesne assignments, to Harris-Seybold Company, Cleveland, Ohio, a corporation of Delaware Application December 20, 1947, Serial No. 792,874

5 Claims. (Cl. 164—55)

This invention relates to power driven machines for cutting and trimming sheet material and, more particularly, to paper cutting machines and to operating and control mechanisms for such machines.

Heretofore, power operated machines of the class described, have operated through a predetermined cycle of operations, and have been permitted, or are capable of, but little variation in mode of operation. The drive and control mechanisms have been expensive and cumbersome. They have also been difficult to adjust.

It is a primary object of the invention to provide increased variability of operation, avoiding the necessity for following exactly a given cycle. Another object is to permit variation in the pressures used. Another object is to make the machine more easily adjustable. Further objects will appear hereinafter.

The machine of our invention will best be understood from the following description in conjunction with the accompanying drawings, in which:

Fig. 1 is a view in side elevation of the machine as seen from the left of Fig. 2;

Fig. 2 is a view in front elevation;

Fig. 3 is a vertical section on line 3—3 of Fig. 2;

Fig. 3a is a vertical section on line 4—4 of Fig. 3;

Fig. 4 is a horizontal section on line 4—4 of Fig. 1;

Fig. 5 is a view in horizontal section taken on line 5—5 of Fig. 1;

Fig. 6 is a view in vertical section on line 6—6 of Fig. 1;

Fig. 7 is a detail view in front elevation showing the knife bar operating unit;

Fig. 8 is a vertical section on line 8—8 of Fig. 7;

Fig. 8a is a section on line 8a—8a of Fig. 7;

Fig. 9 is a horizontal section on line 9—9 of Fig. 7;

Fig. 11 is a detail view in front elevation showing a clamping unit;

Fig. 12 is a detail view in elevation showing control valves and interlock mechanism;

Fig. 16 is a diagrammatic view of hydraulic control mechanism;

Fig. 17 is a longitudinal section taken on line 17—17 of Fig. 4;

Fig. 18 is a vertical section on line 18—18 of Fig. 17;

Fig. 19 is a detail plan view of a part of the mechanism shown in Fig. 18;

Fig. 20 is a detail view similar to Fig. 3 illustrating one operative position of the machine, and Fig. 21 is a detail view similar to Fig. 3 illustrating a second operative position of the machine.

Figure 10:
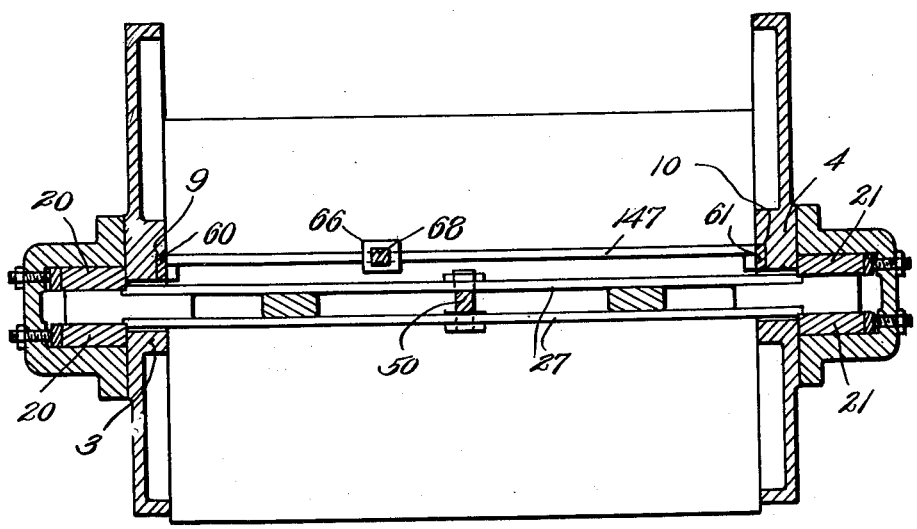
Fig. 10 is a horizontal section on line 10—10 of Fig. 1.

In the drawings, a cutting table or bed 1 is mounted on a base 2 on the sides of which are secured standards 3 and 4 joined at the top by a cross head 5 (Fig. 2). Standards 3 and 4 form channels 6 and 7 (Fig. 4) in which a knife bar frame 8 (Fig. 7) is reciprocally movable. Also formed in standards 3 and 4 are grooves 9 and 10 for guiding a clamp frame 11 shown in Fig. 11.

*The cutting mechanism.*—The knife bar frame 8 (Fig. 7) has draw-bars 20 and 21 which are slidably mounted in the channels 6 and 7. The draw-bars are divided into two parts joined by right and left-hand threaded screws 22—22 and 23—23 provided with adjusting nuts 24 and 25. Access to the adjusting nuts is provided by swingably mounted covers 26—26 (Fig. 5) located intermediate the ends of the standards. Draw-bars 20 and 21 are rigidly joined at the bottom by a braced cross-member 27 and connected at the top by a knife bar 28 carrying a knife 29 which may be adjustably secured thereon by any suitable means such as bolts 30 in the knife and slots 31 in the knife bar. Knife bar 28 is provided with horizontal slots 32—32 which receive rolls 33—33 carried by pins 34 and 35 secured to said draw-bars. Other rolls 36 and 37, carried by pins 38 and 39 secured to the draw-bars, are located at the top of the knife bar. The knife bar also has diagonally disposed slots 40 and 41 in which are disposed slide blocks 42 and 43. These blocks are provided with bores 44—44 which receive the ends of pins 45—45 which are secured to a floating clamp bar 46 (Fig. 3). Rods 47—47 on either end of the floating clamp 46 are adjustably set to check upward movement of the clamp on striking stops 48—48 on the cross head 5. Secured to the cross member 27 by a pin 49 is one end of a piston rod 50, which passes to a piston head 51 (Fig. 16) in a hydraulic cylinder 52 secured to the base of the machine. This cylinder will be referred to as the knife cylinder. The knife bar 28, which is movable horizontally as well as vertically, is provided with stops 53 and 54 (Fig. 7) which strike the standards 3 and 4, and by so doing limit the movement of the knife.

*The stock clamping mechanism.*—The clamp frame 11 (Fig. 11) has vertical rails 60 and 61 which are guided in the grooves 9 and 10. The rails are connected by a cross bar 62 near the bottom and by a clamp bar 63. This clamp bar has a broad clamping foot 64 (Fig. 3) and its top surface is provided with a cushion 65 (Fig. 20). The cross bar 62 is connected by bracket 66 and pin 67 to piston 68 of a hydraulic cylinder 69. This cylinder is secured to the base of the machine and will be referred to as the clamp bar cylinder.

*The controls and power mechanism.*—The source of power is an electric motor 70 which drives a pump 71 (Figs. 1 and 16). The pressure unit 71 is a double pump unit provided with relief valves. The pump unit 71 has a larger pump 71a and a smaller pump 71b, each of which has a relief valve 71c and 71d, respectively. From the larger pump, a pressure line 72 passes to a pilot controlled unloading valve 73. The line 72 then passes to a check valve 74, and thence to a four-way control valve 75.

A conduit 76 passes fluid from valve 75 to the knife cylinder 52, and conduit 77 passes fluid from the cylinder back to the valve 75. The conduit 77 is also connected to the unloading valve 73 by a pilot line 78 and to a sequence valve 79 by a line 80. The sequence valve is a valve which passes flow from one orifice to another until a predetermined pressure is built up and then acts to open a third orifice and to exert pressure through it. A return pipe 81 leads from valve 75 to a reservoir 82. Unloading valve 73 is provided with a return conduit 83 which returns fluid to the reservoir 82. A vent line 84 passes from the relief valve of pump 71b to a pressure adjuster 85 which is regulated by means of a knob 86. A conduit 87 leads from the pressure adjuster 85 to the sequence valve 79. A pressure line 90 passes from the smaller pump to a four-way control valve 91 from which a conduit 92 leads to the clamp cylinder 69. A pressure indicator 93 is interposed in this line. A conduit 94 leads from the clamp cylinder 69 to the sequence valve 79. A conduit 95 leads from the valve 79 back to the control valve 91. A return pipe 96 leads from valve 91 to the reservoir 82. A drain pipe 97 connects the sequence valve 79 and return pipe 96. Fluid in the reservoir 82 is drawn through a straining mechanism 98 into intake pipes 99 leading to the intake side of the pump unit 71. The pump has an exhaust pipe 100 back to the reservoir 82.

Control valve 75 is operated by a valve stem 110 connected to a lock-piece 111 having a notch 112. Lock piece 111 is operated when free by a rod 113 connected to a lever 114 pivoted at 115 to a bracket 116 secured to the base of the machine. Control valve 91 is operated by a valve stem 117 connected to a cam block 118 having a cam surface 119. Cam block 118 is operated by a rod 120 connected to a lever 121 pivoted at 122 to a bracket 123 secured to the base of the machine.

A mechanical lock mechanism shown in Figs. 12 and 16 comprises the cam block 118 and locking block 111 heretofore described in conjunction with a connecting rod 130 slidably mounted in lugs 131 secured to the base 2. One end of the connecting rod 130 carries a bolt 132; the opposite end carries a roll 133. The rod is urged to the right as viewed in Fig. 12 by a spring 134 held under tension between a post 135 held on a collar 136 secured to the rod 130 and a second post 137 secured to one of the lugs 131. The roll 133 is always in contact with cam surface 119. In the locked position shown in Fig. 12, the cam surface has forced the rod to the left to cause the bolt 132 to engage the notch 112 in locking member 111. In this position, both control valves are closed.

Figure 13:
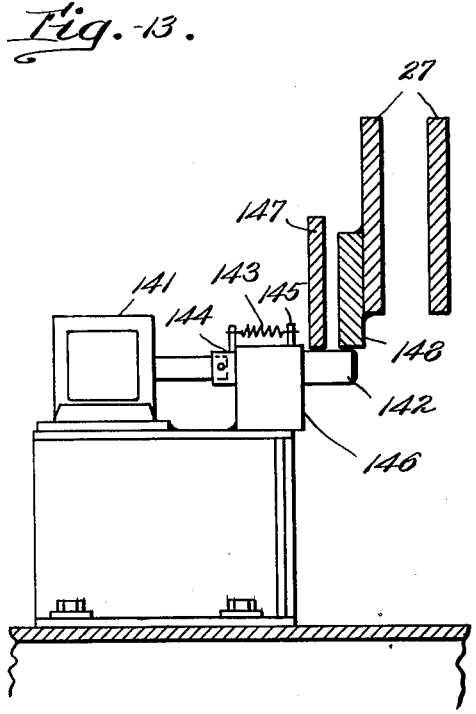
Fig. 13 is a detail view in side elevation of a locking mechanism.
Figure 14:
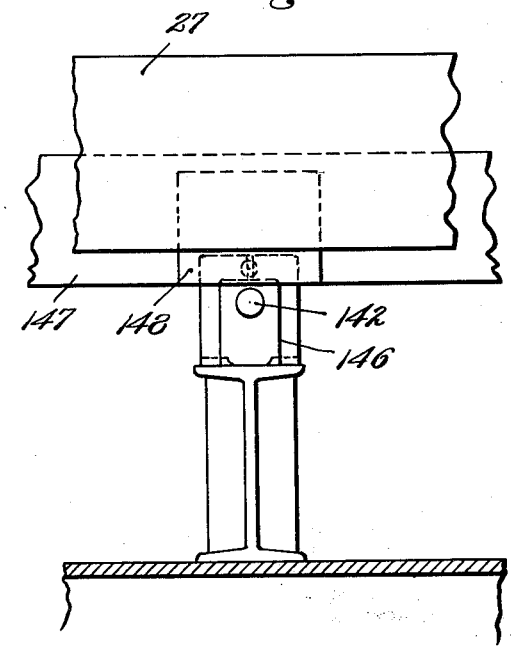
Fig. 14 is a detail view in front elevation of the mechanism of Fig. 13.
Figure 15:
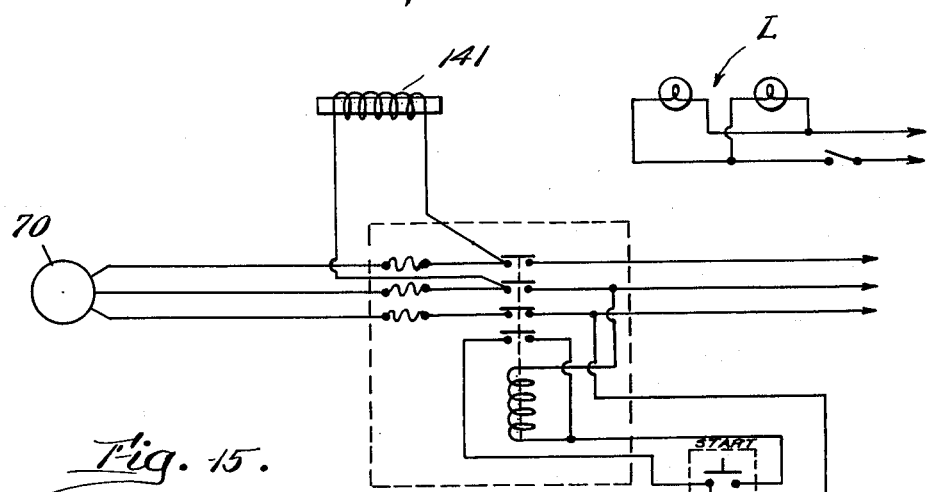
Fig. 15 is a diagrammatic view of electrical control mechanism.

The electrical controls are best observed in Figs. 13, 14 and 15. A switch box 140 located on the front of the base (see also Fig. 2) is used to energize the circuit to the motor 70. Simultaneously, a solenoid 141 is actuated to draw back (i. e., to the left in Fig. 13) a locking bar 142 which is normally urged in the opposite direction by a spring 143 secured to a collar 144 on the bar and to a post 145 on a box or lug 146 in which the bar 142 is slidably mounted. As shown in Fig. 13, the bar 142 in its forward position slides under the blocks 147 and 148 which are respectively secured to the clamp frame 11 and the knife bar frame 8. The function of the lock bar mechanism above described is to lock the clamp and knife bar frames 11 and 8 in upward position when the machine is wholly at rest. If desired, a light circuit L can be added to provide illumination under the cross head 5.

*The stock feeding mechanism.*—The mechanism hereinafter described is best illustrated in Figs. 2, 3, 3a, 4, 17, 18 and 19. As shown in Fig. 3, the stack of paper S is placed flat on the table 1. This stack has to be advanced a measured distance over the table until the portion to be cut off extends over a line between the knife blade 29 and a cutting board 150. This is accomplished by an adjustable gauge fence 151 having contact fingers 152 (Fig. 4). The gauge fence is made in three parts or sections indicated at 153, 154 and 155. These sections are held adjustably by bolts 156 extending from the center section 154 through slots 157—157 in the sections 153 and 155 (Fig. 17).

Bolts 160—160 pass from center section 154 downward through a slot 161 (Fig. 4) in the bed or table 1 into a runner 162 (Fig. 17) guided for movement along the slot. The runner 162 has a bracket 163 secured as by bolts 164 to an endless chain 165 guided about a wheel 166 under the rear end of the table and turned by a sprocket 167 held under the front of the table by a pin 168. A turning wheel 169 is secured to the sprocket. The rear wheel 166 is carried by a yoke 170 having a slot 171 through which a bolt 172 extends to the underside of the table. The yoke 170 may be adjustably secured by bolt 172 to hold the chain 165 properly tightened.

Spaced a short distance back of the turning wheel 169 is a locking mechanism best observed in Figs. 3 and 3a. This mechanism comprises an upper clamping member 174 which may be a lug formed on the underside of the table 1 (see Fig. 3a) and a lower clamping member 175 carried by and slidable on a pin 176. The lower part of member 175 has a slanting or cam surface 177 which is matched by a cam surface 178 on a hub 179 of a lever 180. Swinging this lever about the pin 176 to the right as viewed in Fig. 2 moves the lower clamp upwardly and causes it to press the chain 165 between its upper surface and the lower surface of the upper clamp 174.

The center section 154 of the gauge carries a post 181 (Fig. 17) which carries on its upper end a clamp 182 adapted to grip an endless tape 183 passed about wheels 184 and 185. Wheel 184 is carried by a post 186 mounted at the rear of the table or bed 1, and wheel 185 is carried on a pin 187 in a boss 188 (Fig. 3) in the cross head of the machine. The tape is marked with suitable indicia (not shown) and these are read at the front of the machine through a magnifying lens 189 having a suitable indicator (not shown).

Figure 10A:
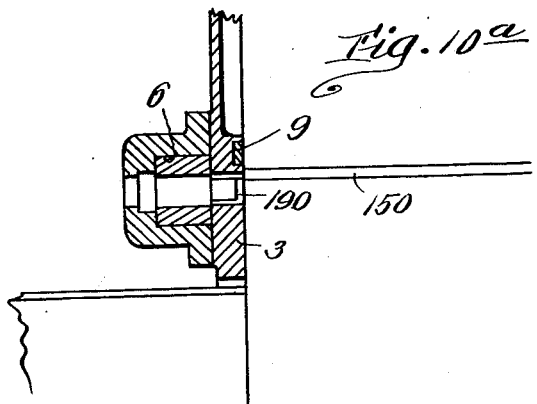
Fig. 10a is a detail view in horizontal section of a modified form of the device.

As shown in Fig. 10a, the channel 6 in standard 3 may be provided with a shield 190 secured by any suitable means at the orifice of the channel. The shield prevents paper trimmings from falling in the channel.

*Mode of operation.*—Before the machine is operated, it will be assumed that the mechanism is ready for operation and at rest. The knife bar 28 and clamp 63 are in the raised position shown in Fig. 6. The solenoid 141 is energized and the locking bar 142 is forward in position to support the clamp frame and knife bar frame as shown in Fig. 3. The dual pump is not operating, and the unloading valve 73 has reduced the pressure in the line 72 to atmospheric pressure. The gauge fence 151 is located at the rear end of the table 1.

The operator places a stack of paper S with one side of the stack against the prongs 152. If this stack is large, and if only one stack is to be trimmed, the gauge fence 151 will have the sections 153, 154 and 155 in alinement as shown in Fig. 4. The operator then turns the wheel 169 until the stack is pushed forward the desired distance as indicated on the tape 183 as viewed through the glass 189. Then the operator throws the switch in switchbox 140. The motor 70 drives the dual pump unit 71, which builds up pressure in the lines 72 and 90. The pump relief valves 71c and 71d are pre-set to permit a desired maximum pressure for both pumps. The maximum for the large pump should be considerably in excess of that for the small pump. Pressure is built up in the vent line 84 which goes from the relief valve of the smaller pump. The operator will adjust knob 86 to reduce the pressure to the clamp cylinder if a lower clamping pressure than the preset maximum is desired. The setting reached will appear on indicator 93.

The cutting operation begins with movement of control lever 121 away from its neutral or normal position and into its clamp depressing or actuating position which causes the cam block 118 to allow the locking bar 130 to move to the right as viewed in Fig. 16 under the urge of spring 154. As soon as the interlock mechanism clears the notch 112 in locking piece 111, the operator may move the control handle 114 to operate the knife bar cylinder 52. During the unlocking above described, the stem 117 is actuating valve 91. Fluid flow begins through line 90 and valve 91 to cylinder 69. The fluid beneath the piston is forced through valve 79, through line 95 to valve 91, and through return line 96 to the reservoir 82. The movement of control lever 121, and consequently the downward movement of the clamp 63, can be stopped at any time. The movement can be reversed at any time, and the operator can also make a series of forward and backward movements of control lever 121 to cause clamp 63 to "pat" the paper and make it settle down. When a firm pressure is desired, the clamp is lowered as far as it will go against the paper with the pressure adjuster 85 set in a given position.

Either following the above operation or practically simultaneously, the operator can push in the control lever 114 to operate the knife bar. However, he cannot move the knife bar until the interlock mechanism has been released due to some downward movement of the clamp control lever 121. Thus the clamp must always precede the knife. The operator may, if he wishes, lower both the clamp and the knife part way and then reverse their movement. He can reverse the movement of the knife alone without reversing the clamp, but the knife always has to start its return stroke before the clamp can start its return stroke. The interlock works both ways. Unless the knife control is freed, the bar cannot move far enough to the left in Fig. 16 to release the cam block 118.

When the operator moves control lever 114 inwardly and locking block 111 is freed, valve 75 is operated to permit flow from the large pump through lines 72 and 76 to the top of cylinder 52. The fluid beneath the piston 51 passes through lines 77 and 81 back to the reservoir 82. As the piston is forced down, it pulls down the frame 8. The knife bar 28 and the floating clamp 46 are pulled down by the frame. When the floating clamp 46 strikes the cushion 65 on the paper clamp 63, the blocks 42 cause the knife bar 28 to be drawn horizontally as well as vertically to give the knife a slicing action. This movement continues until the stops 53 and 54 meet the standards 3 and 4. After the cutting operation is completed, the operator, who has both hands on levers 114 and 121, will normally allow both levers to return to starting or normal position. The valves 75 and 91 are spring loaded, so that when the control levers are released they return immediately to the valve-closing position. Valve 75 now (when closed) passes the fluid under pressure from line 72 to line 77 and valve 91 passes the fluid from line 90 through line 95. The pistons of both cylinders are forced in the opposite direction. Fluid over the piston 51 in cylinder 52 returns through pipe 76, valve 75 and pipe 81 to the reservoir. Fluid over the piston 68 in cylinder 69 passes through line 92, valve 91 and return pipe 96 to the reservoir.

After the control levers have returned to neutral position and the machine is idle but operative, the knife occupies its uppermost or inoperative position. Piston 51 cannot move any further upward in cylinder 52 and the pressure beneath the piston and effective upon the unloading valve 73 rapidly increases. When it reaches a predetermined limiting value, unloading valve 73 operates, thereby connecting the output of the pump 71a directly back to the reservoir so that the pump continues to operate but substantially without load. Meanwhile the clamp has also reached its upper limiting position in which piston 68 cannot move upwardly any further in cylinder 69. As a result the pressure in cylinder 69 also rapidly increases up to a predetermined value which results in operating sequence valve 79, thereby establishing a pressure connection from line 95 to line 80. The unloading valve 73 unloads until the pressure in line 72 as far as check valve 74 is reduced from operating pressure to atmospheric pressure. Return lines 83 and 81, and lines 76, 92, 96 and 97 are also at atmospheric pressure. Line 72 from check valve 74 to valve 75, and lines 77, 78, 80, 84, 87, 90, 94 and 95 are still under operating pressure. Although the machine is not being operated to cut paper, the smaller pump 71b is still working and it maintains enough pressure to keep the clamp bar and knife bar in raised position. The larger pump is idling, and the only flow in its system is from the pump 71a through line 72 as far as the unloading valve and back to the reservoir.

No flow takes place in lines 78 and 80. These are purely pressure lines. When the pump 71a is forcing fluid at full pressure through valve 75, to cause the knife to descend, lines 78 and 80 are at atmospheric pressure; when pump 71a is working to raise the knife bar with a reduced pressure of about half the cutting action pressure and pump 71b is working to raise the clamp with a reduced pressure of about half of its clamping pressure, there is pressure from left to right in lines 78 and 80 (as viewed in Fig. 16) but no flow. When the pump 71a is idling and pump 71b is acting to hold up the clamp, then the pressure in lines 78 and 80 is from right to left. The pressure line 80 thus serves to maintain a holding pressure in cylinder 52 when the pump 71a is idling and valve 73 is unloading, and the pressure line 78 serves as a pilot to regulate valve 73.

It is apparent, from the foregoing description and statement of operation, that the machine of the invention possesses several distinct and important advantages. It is now possible for an operator to bring the clamp and knife down at any speed he chooses and, if not absolutely satisfied with the setting, reverse both mechanisms without first proceeding through the full cutting cycle. He may use the knife to "mark" the top of the stack, and then release the stack from the knife, but not from the clamp, and inspect it. He can use the clamp to "pat down" the stack without committing the knife to any movement, let alone a full cycle of operation. He can "reset" the knife without loosening it from the knife bar. He does this by adjusting the nuts 24 and 25 to narrow or spread the gap between the separate sections of the draw bars. He can thus either raise or lower the knife or tilt it either way as required for proper cutting. It is not necessary to go through a complicated procedure of resetting the knife blade with respect to the knife bar. The interior of the machine is kept free from trimmings of waste material. The machine is easier to operate because there are separate controls for the clamp bar and the knife bar, yet this is achieved without loss of safety because the knife bar cannot be operated in advance of the clamp bar. Further, the operator can always choose the preferred amount of pressure in clamping the stack, thus adapting the pressure easily to the requirements of the material being cut.

We claim:

1. A machine for cutting sheet material and having a knife and a clamp both movable from a raised inoperative position to a working position comprising hydraulic means for separately actuating said knife and said clamp on said working and return strokes of movement, power operated means for supplying fluid pressure to said hydraulic means to produce said working strokes, means for supplying fluid pressure from said fluid pressure supply means for separately retaining said knife and clamp in said raised positions intermediate said working strokes, and latch means engageable with parts of said knife and clamp actuating means operable in response to termination of said fluid pressure supply means for mechanically retaining said knife and said clamp in their raised inoperative positions.

2. A machine for cutting sheet material comprising in combination, a support for said material, a knife movable from a raised inoperative position toward said support on a working stroke to cut sheet material thereon, a clamp movable from a raised inoperative position toward said material for clamping said material upon said support, hydraulic power actuated means for operating said knife in a working cycle including a forward working stroke and a return stroke of movement, a knife actuating pump for supplying fluid under pressure to said hydraulic means, a second hydraulic means for actuating said clamp, a clamp actuating pump for supplying fluid under pressure to said second hydraulic means, means for selectively operating said clamp independently of and in coordinated relation with said knife in a working cycle, means operative upon completion of said knife working cycle for effecting the unloading of said knife actuating pump, means for continuing said clamp pump in operation following completion of said knife operating cycle providing a continuing source of fluid pressure, means for supplying fluid pressure from said continuous source to hold both said clamp and knife in said raised inoperative positions, means for terminating said continuing source of fluid pressure, and latch means engageable with parts of said knife and clamp actuating means operable upon said termination of fluid pressure for mechanically retaining said knife and clamp in their said raised inoperative positions.

3. A machine for cutting sheet material comprising in combination, a support for said material, a knife movable from a raised inoperative position toward said support on a working stroke to cut sheet material thereon, a clamp movable from a raised inoperative position toward said material for clamping said material upon said support, hydraulic power actuated means for operating said knife in a working cycle including a forward working stroke and a return stroke of movement, a knife actuating pump for supplying fluid under pressure to said hydraulic means, a second hydraulic means for actuating said clamp, a clamp actuating pump for supplying fluid under pressure to said second hydraulic means, means for selectively operating said clamp independently of and in coordinated relation with said knife in a working cycle, means operative upon completion of said knife working cycle for effecting the unloading of said knife actuating pump, means for continuing said clamp pump in operation following completion of said knife operating cycle providing a continuing source of fluid pressure, means for supplying fluid pressure from said continuing source to hold both said clamp and knife in said inoperative positions, drive means for actuating said clamp pump, and latch means engageable with parts of said knife and clamp actuating means operable upon termination of operation of said drive means for mechanically retaining said knife and clamp in their said raised inoperative positions.

4. A machine for cutting sheet material comprising in combination, a support for said material, a knife movable from a raised inoperative position toward said support on a working stroke to cut sheet material thereon, a clamp movable from a raised inoperative position toward said material for clamping said material upon said support, hydraulic power actuated means for operating said knife in a working cycle including a forward working stroke and a return stroke of movement, a knife actuating pump for supplying fluid under pressure to said hydraulic means, a second hydraulic means for actuating said clamp, a clamp actuating pump for supplying fluid under pressure to said second hydraulic means, means for selectively operating said clamp independently of and in coordinated relation with said knife in a working cycle, means operative upon completion of said knife working cycle for effecting the unloading of said knife actuating pump, means for continuing said clamp pump in operation following completion of said knife operating cycle providing a continuing source of fluid pressure, and means for supplying fluid pressure from said continuing source to hold both said clamp and knife in said raised inoperative positions.

5. A machine for cutting sheet material comprising in combination, a support for said material, a knife movable from a raised inoperative position toward said support on a working stroke to cut sheet material thereon, a clamp movable from a raised inoperative position toward said material for clamping said material upon said support, a relatively large hydraulic power actuated means for operating said knife in a working cycle including a forward working stroke and a return stroke of movement, a relatively large knife actuating pump for supplying fluid under pressure to said hydraulic means, a relatively small hydraulic means for actuating said clamp, a relatively small clamp actuating pump for supplying fluid under pressure to said small hydraulic means, means for selectively operating said clamp independently of and in coordinated relation with said knife in a working cycle, means operative upon completion of said knife working cycle for effecting the unloading of said large actuating pump, means for continuing said small pump in operation following completion of said knife operating cycle providing a continuing source of fluid pressure, and means for supplying fluid pressure from said continuing source to hold both said clamp and knife in said raised inoperative positions.

FRANK M. HILL.
HAROLD H. LE BLANC.

References Cited in the file of this patent

UNITED STATES PATENTS

| Number | Name | Date |
|---|---|---|
| 183,486 | Burr | Oct. 24, 1876 |
| 257,632 | Feister | May 9, 1882 |
| 528,738 | Pfouts | Nov. 6, 1894 |
| 594,019 | Jefferies | Nov. 23, 1897 |
| 665,127 | Parmelee | Jan. 1, 1901 |
| 1,051,381 | Berry | Jan. 28, 1913 |
| 1,200,802 | Berry | Oct. 10, 1916 |
| 1,515,013 | DeCosta | Nov. 11, 1924 |
| 1,841,285 | Gilmore | Jan. 12, 1932 |
| 1,880,598 | Tyler et al. | Oct. 4, 1932 |
| 1,884,336 | Stanley | Oct. 25, 1932 |
| 1,926,669 | Dodd | Sept. 12, 1933 |
| 1,990,392 | Schroeter et al. | Feb. 5, 1935 |
| 2,009,536 | Warg | July 30, 1935 |
| 2,115,571 | Cooper | Apr. 26, 1938 |
| 2,269,328 | Williamson | Jan. 6, 1942 |
| 2,278,713 | Riddle | Apr. 7, 1942 |
| 2,339,641 | Jensen | Jan. 18, 1944 |
| 2,379,171 | McLaughlin | June 26, 1945 |
| 2,387,876 | Bright | Oct. 30, 1945 |
| 2,445,081 | Pouille | July 13, 1948 |